(12) United States Patent
Chang

(10) Patent No.: US 6,991,162 B2
(45) Date of Patent: Jan. 31, 2006

(54) HANDHELD DEVICE WITH TRACT INPUT FUNCTION

(75) Inventor: Tso-Chia Chang, Taichung (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 11/001,659

(22) Filed: Nov. 30, 2004

(65) Prior Publication Data

US 2005/0116045 A1    Jun. 2, 2005

(30) Foreign Application Priority Data

Dec. 1, 2003    (TW) ............................... 92133755 A

(51) Int. Cl.
*G06K 7/00*    (2006.01)
(52) U.S. Cl. ..................................... 235/440
(58) Field of Classification Search ............... 235/440, 235/472, 439, 470, 462.01, 462.45, 462.49
See application file for complete search history.

(56) References Cited

U.S. PATENT DOCUMENTS

| | | | | |
|---|---|---|---|---|
| 4,876,571 A | * | 10/1989 | Nakamura et al. ............ 399/84 |
| 5,656,804 A | * | 8/1997 | Barkan et al. ......... 235/472.01 |
| 6,002,815 A | * | 12/1999 | Immega et al. ............. 382/312 |
| 6,050,490 A | * | 4/2000 | Leichner et al. ....... 235/462.49 |
| 6,128,670 A | * | 10/2000 | Hashimoto et al. ............ 710/1 |
| 6,729,547 B1 | * | 5/2004 | Charlier et al. ........ 235/462.45 |

\* cited by examiner

Primary Examiner—Daniel Stcyr
Assistant Examiner—Edwyn Labaze
(74) Attorney, Agent, or Firm—Thomas, Kayden, Horstemeyer & Risley

(57)    ABSTRACT

A handheld device with tract input function, which allows a user to move the whole handheld device for generating input data for the handheld device itself. The handheld device includes a sensor disposed on the handheld device for detecting the movement of the handheld device to output a displacement signal; a micro-controller coupled to the sensor to generate a tract signal in response to the displacement signal; an identifier coupled to the micro-controller to identify the tract signal for outputting at least a corresponding symbol for the user to select as the input data; a display device disposed on the handheld device; and a memory for storing the input data. The display device displays at least the corresponding symbol for the user to select as the input data corresponding to a desired symbol.

20 Claims, 4 Drawing Sheets

HANDHELD DEVICE WITH TRACT INPUT FUNCTION

This application claims the benefit of Taiwan application Serial No. 92133755, filed Dec. 1, 2003, the subject matter of which is incorporated herein by reference.

BACKGROUND OF THE INVENTION

1. Field of the Invention

The invention relates in general to a handheld device, and more particularly to a handheld device with tract input function.

2. Description of the Related Art

Along with the rapid advance in electronic industry, the renewal and updating in the techniques of mobile telecommunication are vast and fast, and various handheld devices such as mobile phone and PDA are invented and marketed one after another. Take the mobile phone for example, apart from the basic function of voice communication, other functions such as voice mail and short message are also provided to further enhance the function of a mobile phone.

Since short message is an important function for the user, the handiness of message input has much to do with operational convenience and is a crucial factor in terms of the selection and purchase of a mobile phone. The short message normally includes, for example, characters of English or Chinese, and a plurality of existing symbols. Take Chinese characters in for example, the input method may be Mandarin phonetic symbol (MPS) input method, Pinyin input method or stroke input method, which may differ according to the model and the make chosen.

However, all of the input methods have certain degree of operational inconvenience for requiring some kind of input skills. Take the input methods of Chinese characters for example. If the MPS input method is used and the user is not familiar with pronunciation and Mandarin phonetic symbol system, the user will waste a large amount of time struggling with the correct spelling of Mandarin phonetic system. If the stroke input method is used, the user needs to figure out the number of strokes used in a character, moreover, it is rather time consuming for the user to pick up a character from a long list of characters having the same number of strokes. If the Pinyin input method is used, the user needs to be familiar with either the General Pinyin system or the Hanyu Pinyin system.

Therefore, it is necessary to develop an easy and simple input method, which can be accepted by the majority of users, so as to resolve the inconvenience of inputting characters of any language in a conventional mobile.

SUMMARY OF THE INVENTION

It is therefore an object of the invention to provide a handheld device with tract input function to reduce the inconvenience of the input method.

According to the object of the invention, a handheld device with tract input function is provided. The handheld device is disclosed as follows:

The handheld device with tract input function generates input data according to the movement by the user. The handheld device includes a display, a sensor, a micro-controller, a recognizer, a control interface and a memory. The sensor is for detecting the movement of the handheld device so as to generate a displacement signal. The micro-controller is for converting the displacement signal into a tract signal to be recognized by the recognizer and displayed on a display by the control interface. After the corresponding symbol of the tract signal has been identified by the recognizer, the micro-controller has the symbol saved into the memory and displayed on the display.

When implementing the tract input function, the input mode can be set to be text mode or graphic mode. Then, the optical-sensor or the acceleration sensor can be moved to form a tract. Under the graphic mode, the formed tract can be compressed and saved as a graph file without going through the recognition procedure. On the other hand, under the text mode, when the tract signal is formed, the recognizer determines the corresponding symbol of the tract signal. If only one symbol corresponds to the tract signal, the user can verify whether this character is the desired one: if so, the symbol is saved, otherwise, input again. Besides, if more than one symbol is recognized by the recognizer, the system displays a symbol list for the user to choose. If the desired character is included in the list, the user can have it selected and saved, otherwise, the user needs to re-input again.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
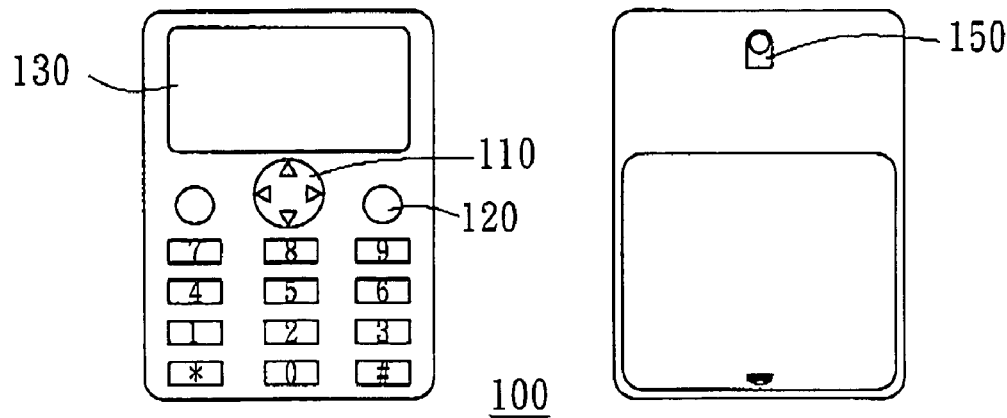
FIG. 1 is a mobile phone according to a preferred embodiment of the invention.

The object of the invention is to improve the input convenience of a handheld device. In the preferred embodiment, the handheld device is exemplified by a mobile phone. Referring to FIG. 1, a mobile phone according to a preferred embodiment of the invention is shown. The front side of mobile phone 100 is equipped with a direction key 110, a function key 120, a display 130 and number keys, while the rear side is equipped with a sensor 150. The function key 120 can be used as a recognition button of tracts. The sensor 150, an optical-sensor or an acceleration sensor for instance, is for sensing the movement of the mobile phone.

Figure 2A:
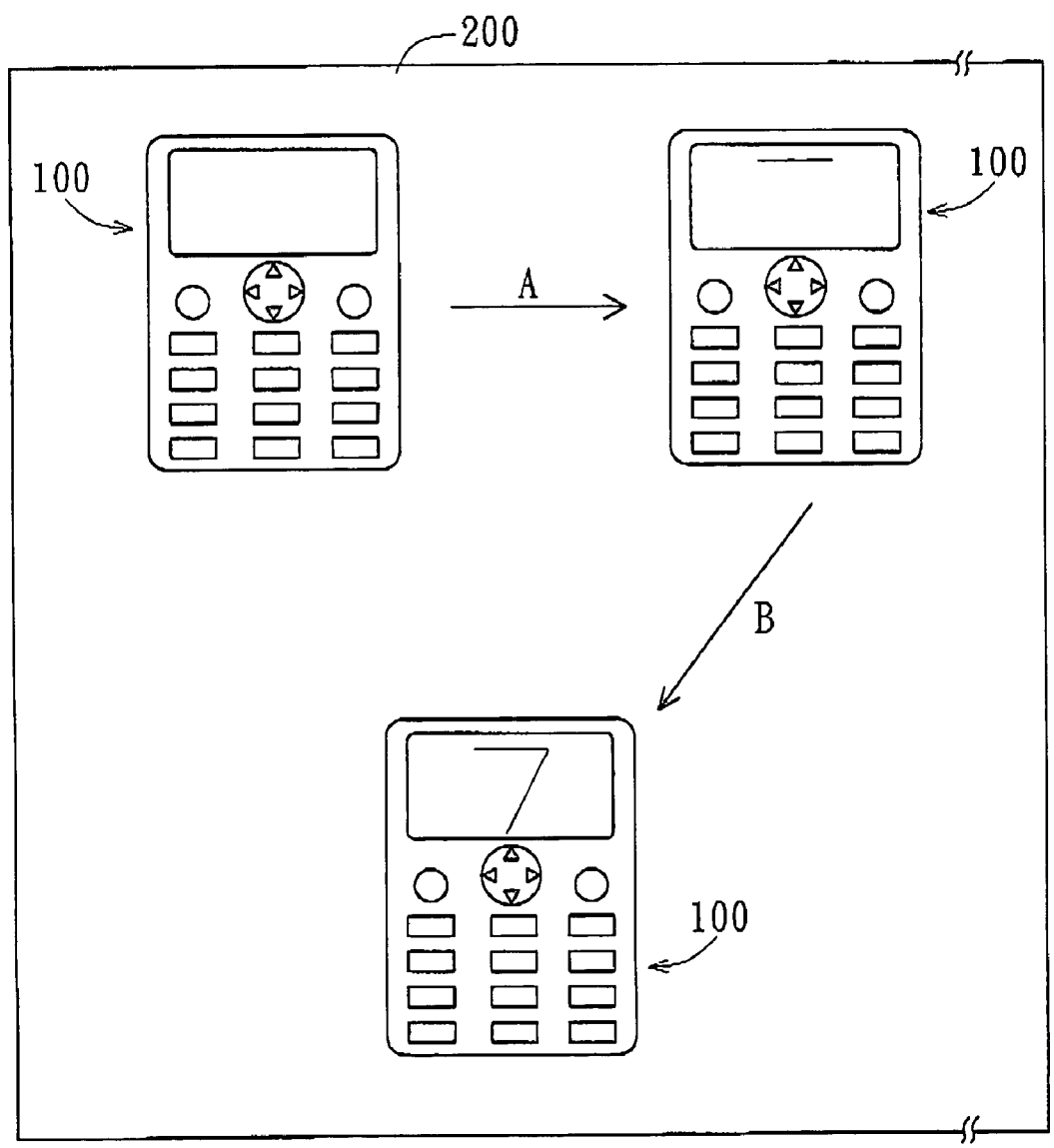
FIG. 2A is a diagram of moving the mobile phone to generate an input.

Referring to FIG. 2A, a diagram of moving the mobile phone to generate an input is shown. When using the tract input method, the user moves the mobile phone 100 on the plane 200, which is a desktop surface, a book or the user's palm, so as to sense the movement of the mobile phone 100 and generate a displacement signal. When moving the mobile phone 100, it is the sensor 150 that senses the movement of the mobile phone 100 by the reflections from the plane 200 so as to output the displacement signal. Then, the displacement signal can be converted into a tract signal to be displayed on the display 130 for the user to view, which will be elaborated below. When using tract input, the user presses the function key 120 to start generating the tract signal. For example, when the mobile phone 100 moves from left to right along tract A, the display 130 shows a horizontal line according to the tract A. After that, when the mobile phone 100 moves to the left-down along tract B, the display 130 shows a slope line according to tract B. Then, the user can release the function key 120 to end the tract input. Meanwhile, the display 130 shows a tract looks like the number 7.

Figure 2B:
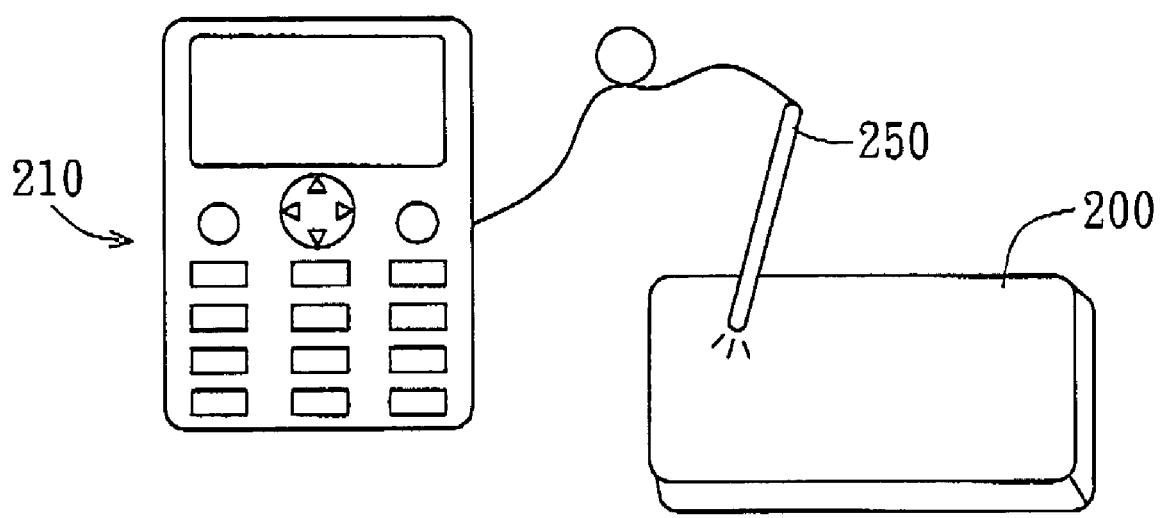
FIG. 2B is a diagram of a mobile phone with tract input pen.

Instead of equipped inside the mobile phone 100, the sensor 150 can be equipped outside of the mobile phone 100. Referring to FIG. 2B, a diagram of a mobile phone with tract input pen is shown. The tract input pen 250 includes the sensor 150. When moving on the plane 200, the tract input pen 250 outputs displacement signal to the mobile phone 210 via the signal line for further processing.

Figure 3A:
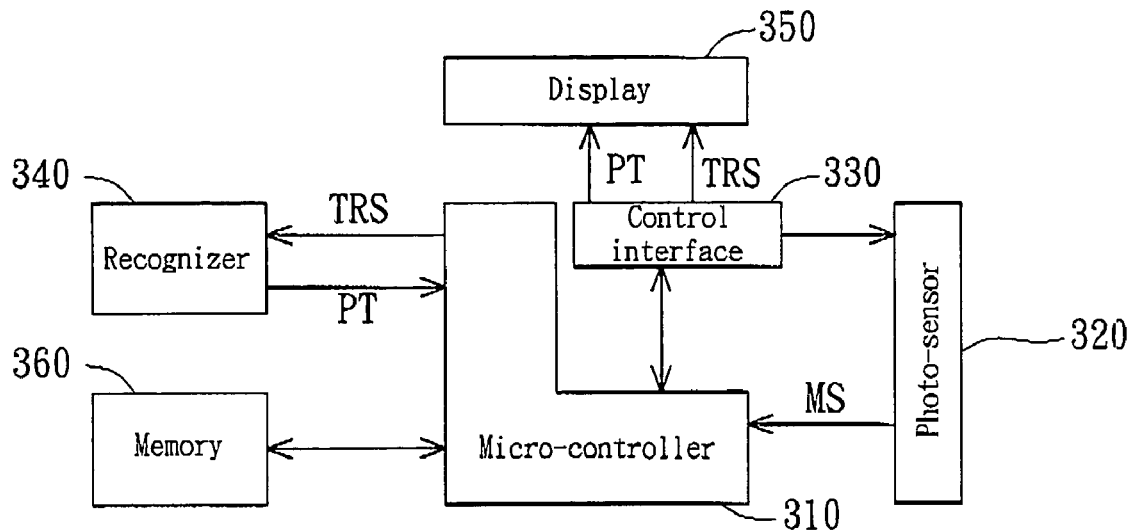
FIG. 3A is a block diagram showing a tract sensing unit of a handheld device is shown.

Referring to FIG. 3A, a block diagram of a tract sensing unit of a handheld device is shown. The tract sensing unit includes a micro-controller 310, an optical-sensor 320, a control interface 330, an identifier 340 or recognizer a display 350 and a memory 360. When moving, the optical-sensor 320 generates a displacement signal MS to the micro-controller 310. After receiving the displacement signal MS, the micro-controller 310 converts the displacement signal MS into a tract signal TRS. On one hand, the tract signal TRS is displayed on the display 350 by the control interface 330; on the other hand, the tract signal TRS is input into the identifier 340, so that a correct symbol PT can be selected for the user to use. After the symbol PT selected by the identifier 340 is input into the micro-controller 310 as input data, the symbol PT can also be displayed on the display 350 by the control interface 330 and saved in the memory 360.

Figure 3B:
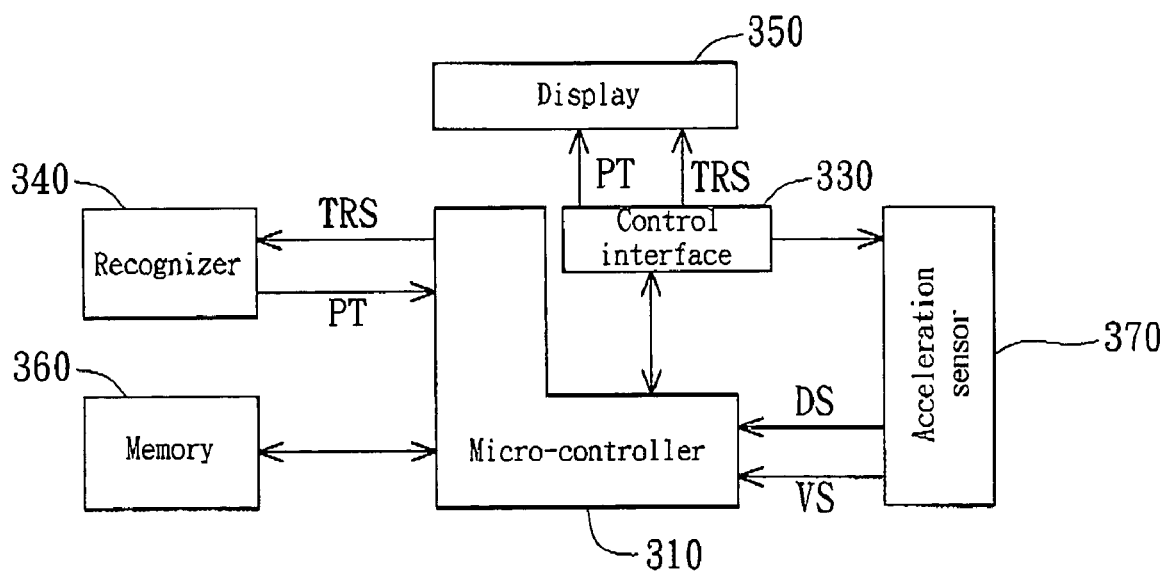
FIG. 3B is a block diagram of another tract sensing unit of a handheld device.

Sensor used for detecting the movement of the handheld device is not limited to optical sensor. Referring to FIG. 3B, a block diagram of another tract sensing unit of a handheld device is shown. The tract sensing unit includes the micro-controller 310, an acceleration sensor 370, the control interface 330, the identifier 340, the display 350 and the memory 360. The acceleration sensor 370 can be disposed in the handheld device or coupled to handheld device via a signal line. While moving, the acceleration sensor 370 outputs the displacement signal, which includes two parts: a direction signal DS and an acceleration signal VS, which respectively determines the direction and length of the tract signal TRS output by the micro-controller 310. The acceleration sensor 370 can be an element such as Dual Axis iMEMS® Accelerometers, a product of the Analog Device. After determining the tract signal TRS in response to the direction signal DS and the acceleration signal VS, the micro-controller 310 can have the tract signal TRS displayed on the display 350 by the control interface 330 and use the identifier 340 to select the correct symbol PT for the user to choose. The processing procedures are disclosed above and are not repeated here.

Figure 4:
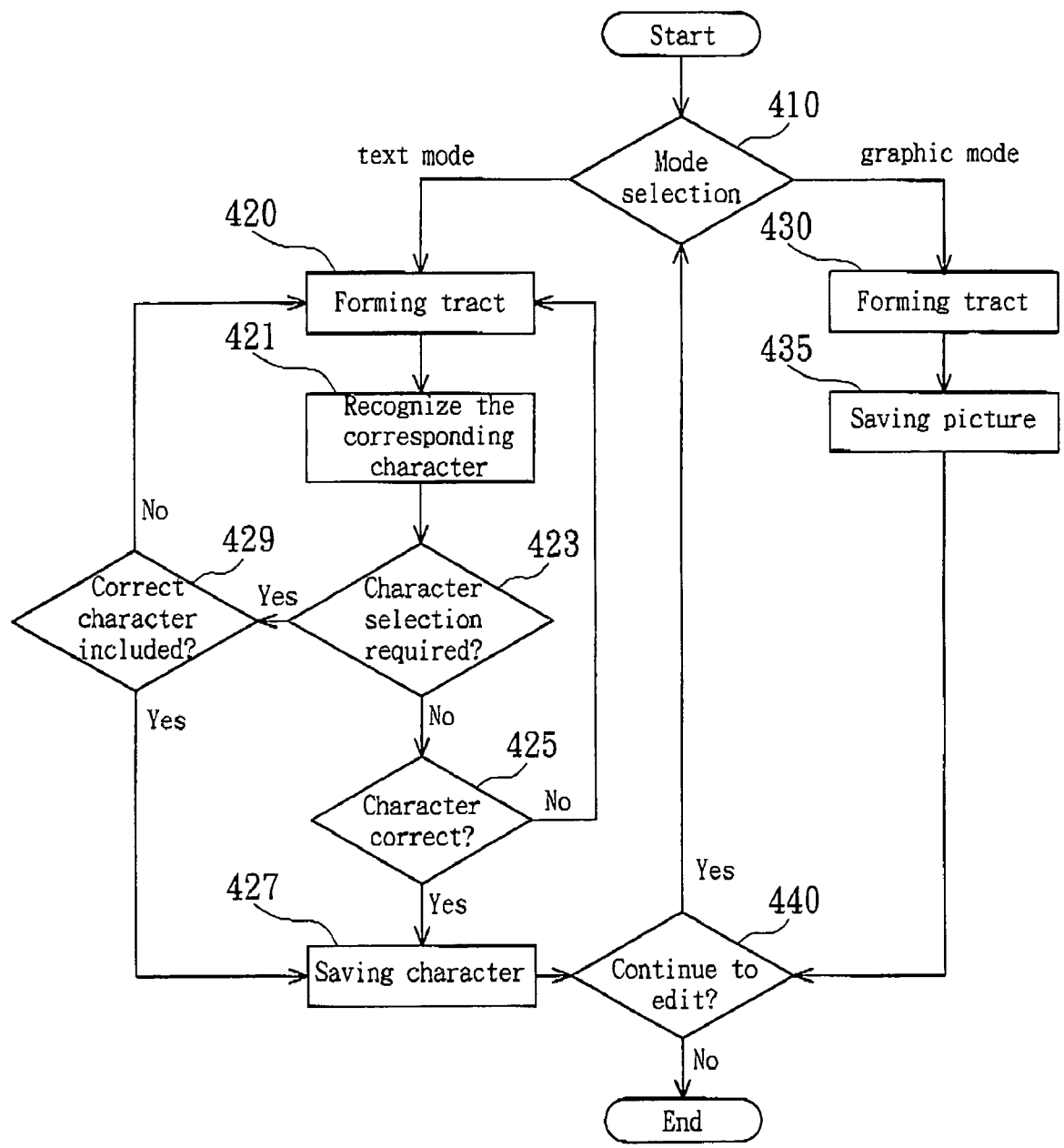
FIG. 4 is a flow chart of the tract input method according to the preferred embodiment of the invention.

Referring to FIG. 4, a flow chart of the tract input method according to the preferred embodiment of the invention is shown. First of all, the user can set the input mode to be text mode or graphic mode as a basis of recognition (step 410). Under text mode, the user can move the optical-sensor or the acceleration sensor to form a tract (step 420); meanwhile, the identifier determines the corresponding characters, Chinese or English, for example, in response to the tract signal (step 421). Then, in step 423, a determination is made if it is required to select characters, if no, which means only one character is output by the identifier, user verifies if the character is the desired input in step 425. If it is the desired input, save the character (step 427), otherwise, a determination is made whether the user continues input or not (step 440). In step 423, if the identifier identifies more than one corresponding character of the formed tract, all of the corresponding characters of the tract are shown for the user to choose (step 429). If the desired character is included in the list, the user can select and save it (step 427); if none of the characters is correct, the user needs to re-input again to form a new tract (step 420).

On the other hand, if the user chooses to input under graphic mode, the identification procedure can be ignored. After the tract signal is formed (step 430), the graph drawn by the user can be saved directly for the following editing (step 435). In practice, the user can use this function to draw freely. The user can share the drawing with others or use the drawing as a signature file or a desktop wall paper. To save memory space, the graph files can be compressed and saved. For example, the graph files can be compressed according to TIFF or JPEG format.

After a graph or a character has been saved but needs to be edited again, the sensor will be moved to form a tract (determined to be "YES" in step 440); otherwise, the editing is terminated (determined to be "NOT" in step 440). It is noteworthy that when operating, the identifier 340 can be incorporated with an English recognition software, the Graffiti® transcription input recognition method of the Palm Company for instance, to recognize English letters and incorporated with other recognition software to recognize Chinese characters. The recognition capability varies according to the function of the recognition software.

The handheld device with tract input function disclosed in above preferred embodiment of the invention has at least the following advantages of:

1. having graph drawing function in addition to text editing function;

2. closely approximating conventional transcription input, having very little entrance barrier.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld device with tract input function, the handheld device comprising:

an optical sensor disposed on the handheld device for detecting the movement of the handheld device to output a displacement signal when the handheld device is set for generating input data according to the movement of the handheld device by a user;

a micro-controller coupled to the optical sensor to generate a tract signal in response to the displacement signal;

an identifier coupled to the micro-controller to selectively identify the tract signal for outputting at least a corresponding symbol according to the tract signal for the user to select as the input data;

a display device disposed on the handheld device and coupled to the micro-controller; and a memory for storing the input data;

wherein when the handheld device is in a text mode and the whole handheld device is moved in a way corresponding to a desired symbol, the identifier outputs said at least the corresponding symbol and the display device displays said at least the corresponding symbol for the user to select as the input data corresponding to the desired symbol;

whereby the handheld device selectively serves as an input device for the handheld device through the movement of the whole handheld device by the user.

2. The handheld device according to claim 1, wherein the optical sensor generates the displacement signal in response to reflections from a plane when the handheld device moves thereon parallelly.

3. The handheld device according to claim 1, further comprising a recognition button, wherein when the user presses the recognition button, the micro-controller generates the tract signal, and when the user releases the recognition button, the micro-controller stops outputting the tract signal.

4. The handheld device according to claim 1, further comprising a control interface for controlling the display, wherein if the identifier fails to identify the tract signal, a plurality of symbols possibly corresponding to the tract signal is shown on the display for the user to select.

5. The handheld device according to claim 1, wherein when the handheld device is in a graphic mode, the tract signal corresponding to the movement of the handheld is stored in the memory as a graph file.

6. A tract input method utilizing a handheld device with tract input function comprising: an optical sensor disposed on the handheld device for detecting the movement of the handheld device to output a displacement signal when the handheld device is set for generating input data according to the movement of the handheld device by a user, a micro-controller coupled to the optical sensor to generate a tract signal in response to the displacement signal; an identifier coupled to the micro-controller to selectively identify the tract signal for outputting at least a corresponding symbol according to the tract signal for the user to select as the input data, a display device disposed on the handheld and coupled to the micro-controller, a memory for storing the input data, wherein when the handheld device is in a text mode and the whole handheld device is moved in a way corresponding to a desired symbol, the identifier outputs said at least the corresponding a symbol and the display device displays said at least the corresponding symbol for the user to select as the input data corresponding to the desired symbol, whereby the handheld device selectively serves as an input device for the handheld device through the movement of the whole handheld device by the user, the method comprising:

a. moving the optical sensor of the handheld device so as to generate a tract signal to display on the display instantly;

b. outputting at least one corresponding symbol by identifying the tract signal, proceeding to step c if more than one symbol is identified, otherwise, proceeding to step d;

c. if the symbols comprising a desired symbol, proceeding to step c1, otherwise, proceeding to step a;

c1. selecting the desired symbol from the symbols as the input data, saving the desired symbol and ending the method; and d. saving the symbol as the input data if the symbol is the desired symbol.

7. The method according to claim 6, wherein step b further comprises the following step:

Identifying the at least one symbol according to a tract signal list.

8. The method according to claim 7, wherein the symbol is a graph.

9. The method according to claim 7, wherein the symbol is a character.

10. The method according to claim 6, further comprising the following steps:

setting an operation mode to be a text mode or a graphic mode, sequentially performing step a and step b if the text mode is adopted, and sequentially performing step a and step e if the graphic mode is adopted; and e. saving the tract signal as a graph file.

11. The method according to claim 10, wherein the graph file is compressed and saved.

12. The method according to claim 11, wherein the graph file is compressed according to TIFF format.

13. The method according to claim 11, wherein the graph file is compressed according to JPEG format.

14. A handheld device with tract input function, the handheld device comprising:

an acceleration sensor disposed on the handheld device for detecting the movement of the handheld device to output a displacement signal when the handheld device is set for generating input data according to the movement of the handheld device by a user;

a micro-controller coupled to the acceleration sensor to generate a tract signal in response to the displacement signal;

an identifier coupled to the micro-controller to selectively identify the tract signal for outputting at least a corresponding symbol according to the tract signal for the user to select as the input data;

a display device disposed on the handheld device and coupled to the micro-controller; and a memory for storing the input data;

wherein when the handheld device is in a text mode and the whole handheld device is moved in a way corresponding to a desired symbol, the identifier outputs said at least the corresponding symbol and the display device displays said at least the corresponding symbol for the user to select as the input data corresponding to the desired symbol;

whereby the handheld device selectively serves as an input device for the handheld device through the movement of the whole handheld device by the user.

15. The handheld device according to claim 14, further comprising a recognition button, wherein when the user presses the recognition button, the micro-controller generates the tract signal, and when the user releases the recognition button, the micro-controller stops outputting the tract signal.

16. The handheld device according to claim 14, wherein the displacement signal comprises a direction signal and an acceleration signal, the micro-controller determines extending direction of the tract signal according to the direction signal and determines extending length of the tract signal according to the acceleration signal.

17. The handheld device according to claim 14, further comprising a control interface for controlling the display device, wherein if the identifier fails to identify the tract signal, a plurality of symbols possibly corresponding to the tract signal are shown on the display via the control interface for the user to select.

18. The handheld device according to claim 14, wherein the acceleration sensor is the Dual Axis iMEMS® Accelerometers of the Analog Device Company.

19. The handheld device according to claim 14, wherein the identifier identifies English letters according to the Graffiti® transcription input method.

20. The handheld device according to claim 14, wherein when the handheld device is in a graphic mode, the tract signal corresponding to the movement of the handheld is stored in the memory as a graph file.

* * * * *